No. 779,768. PATENTED JAN. 10, 1905.
P. F. COHEN.
SCALE MAKING MACHINE.
APPLICATION FILED FEB. 26, 1904.

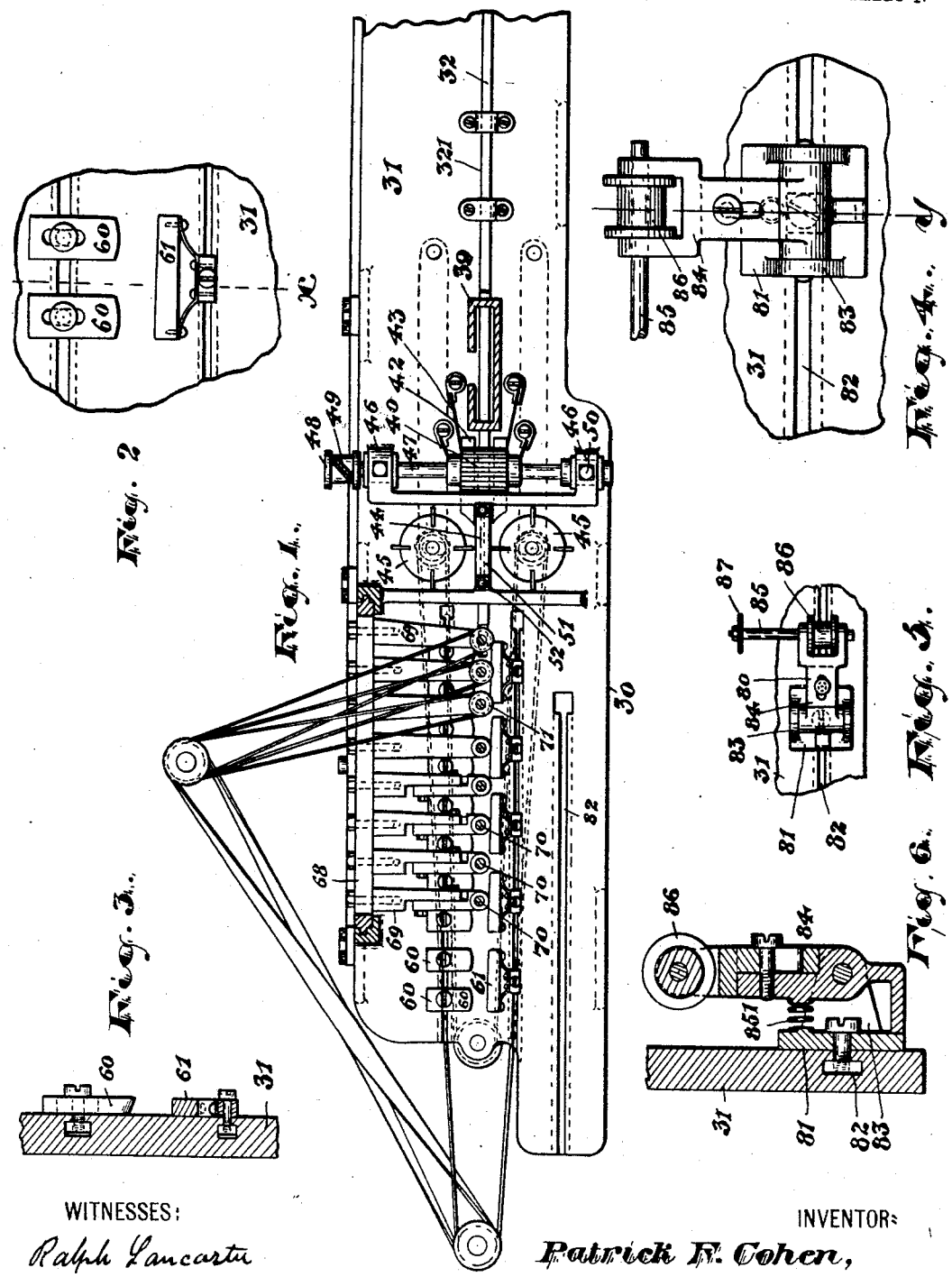

7 SHEETS—SHEET 2.

WITNESSES: Ralph Lancaster  Russell M. Everett

INVENTOR: Patrick F. Cohen,
BY Charles H. Pell,
ATTORNEY.

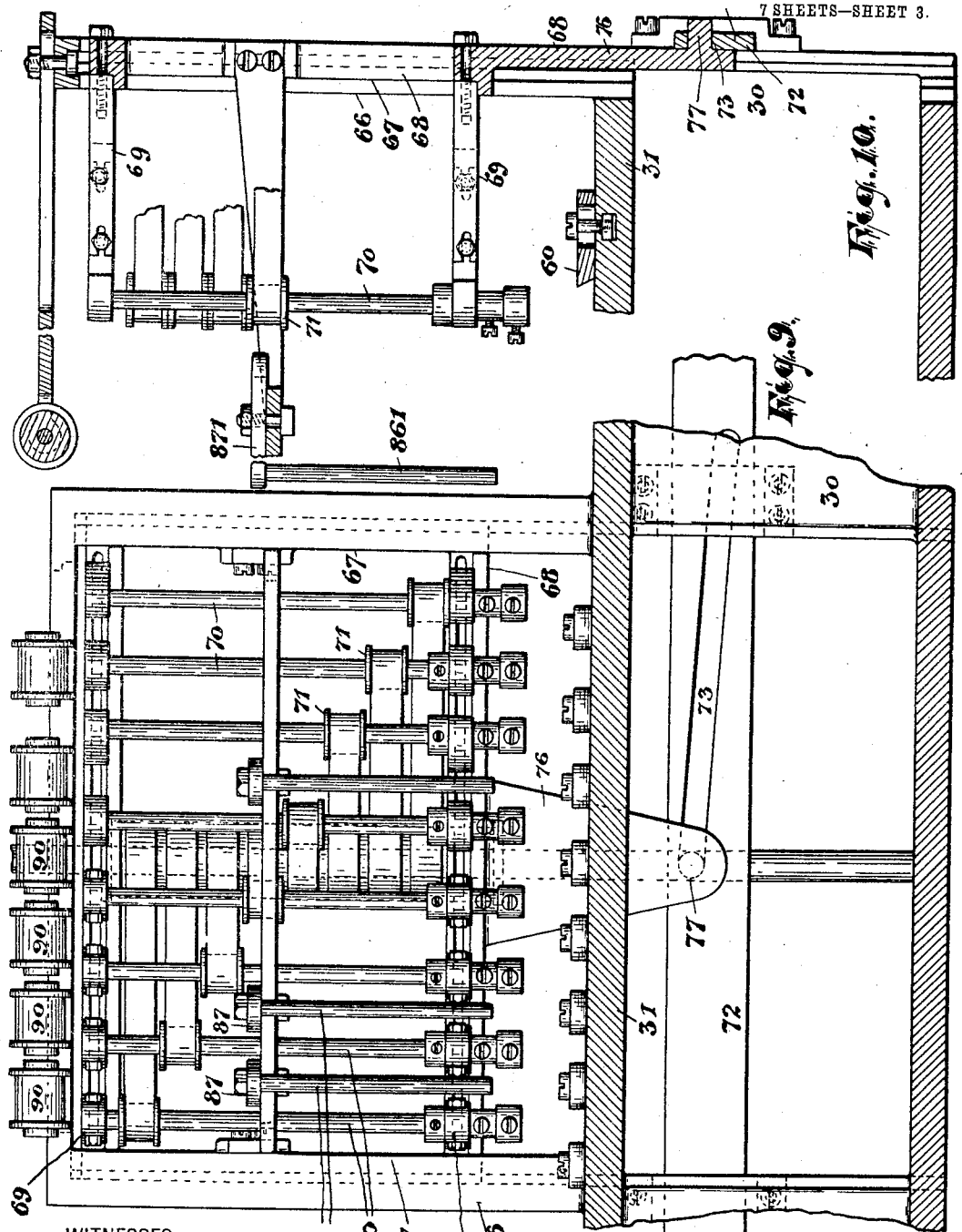

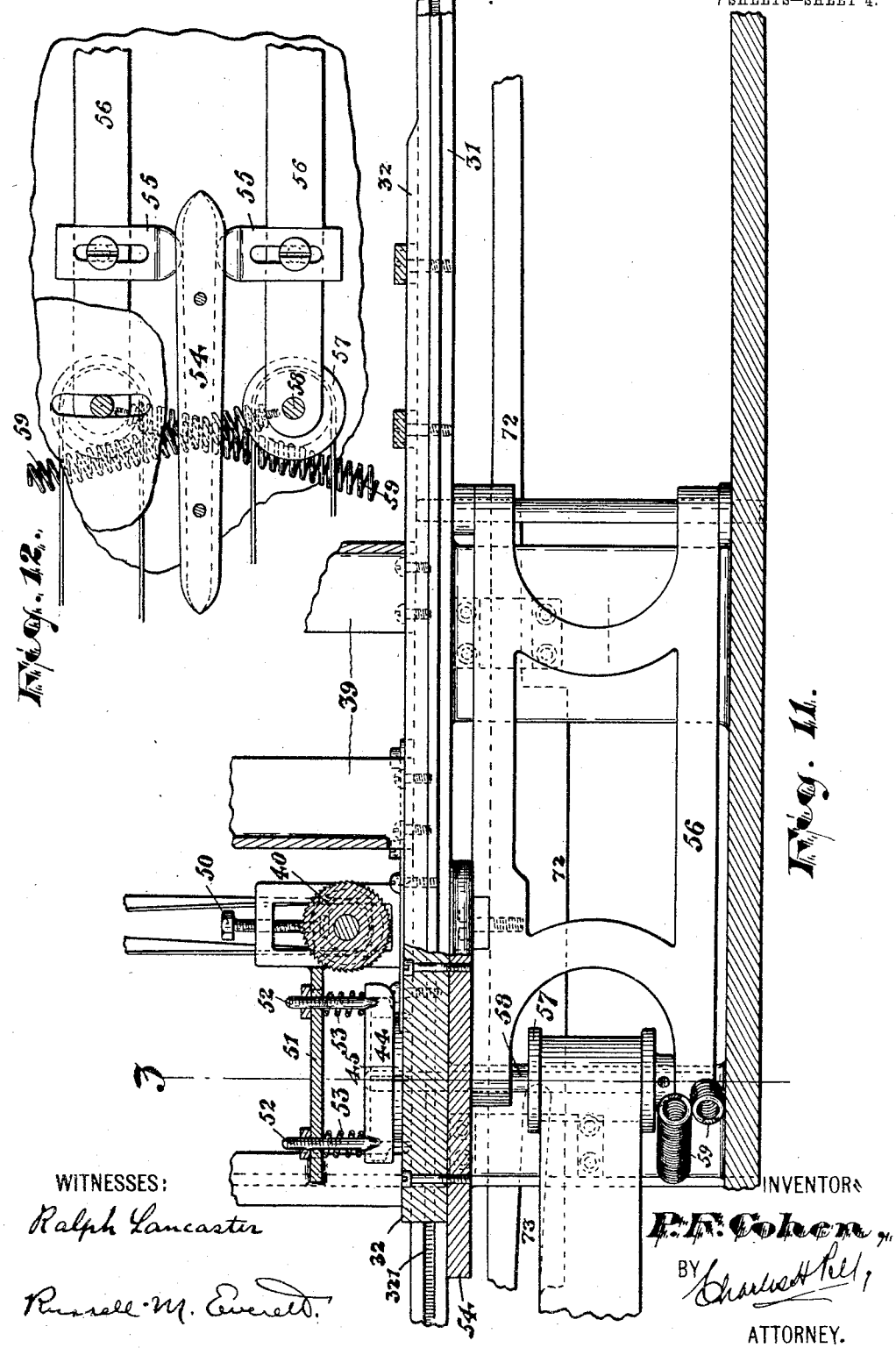

No. 779,768. PATENTED JAN. 10, 1905.
P. F. COHEN.
SCALE MAKING MACHINE.
APPLICATION FILED FEB. 26, 1904.
7 SHEETS—SHEET 5.
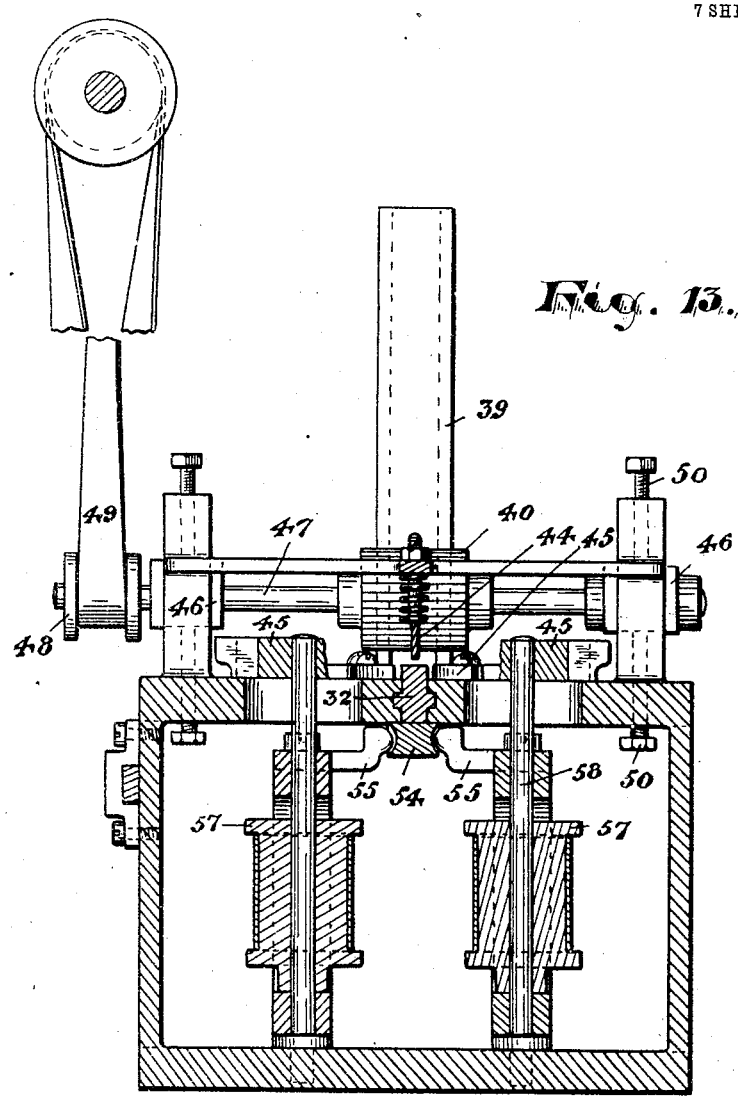
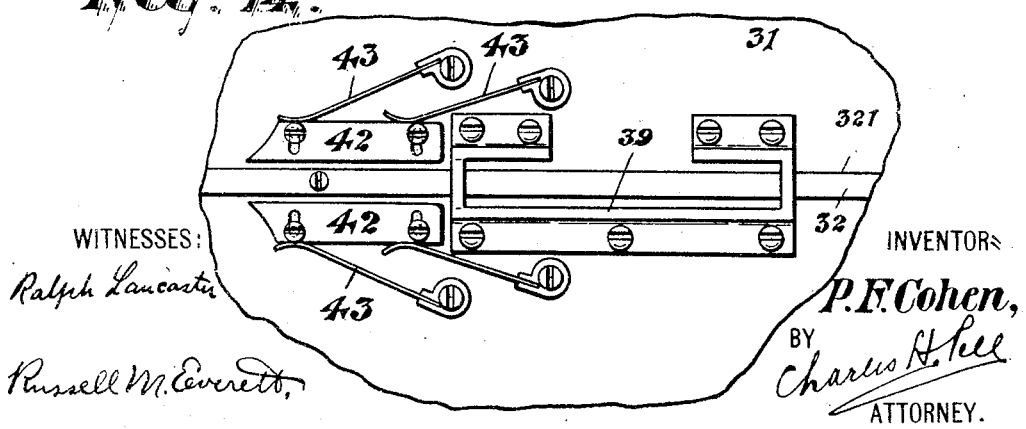
WITNESSES:
Ralph Lancaster
Russell M. Everett
INVENTOR
P. F. Cohen,
BY Charles H. Pell
ATTORNEY.

No. 779,768. PATENTED JAN. 10, 1905.
P. F. COHEN.
SCALE MAKING MACHINE.
APPLICATION FILED FEB. 26, 1904.

7 SHEETS—SHEET 6.

WITNESSES:
Ralph Lancaster
Russell M. Everett

INVENTOR:
Patrick F. Cohen,
BY
Charles H. Pell
ATTORNEY.

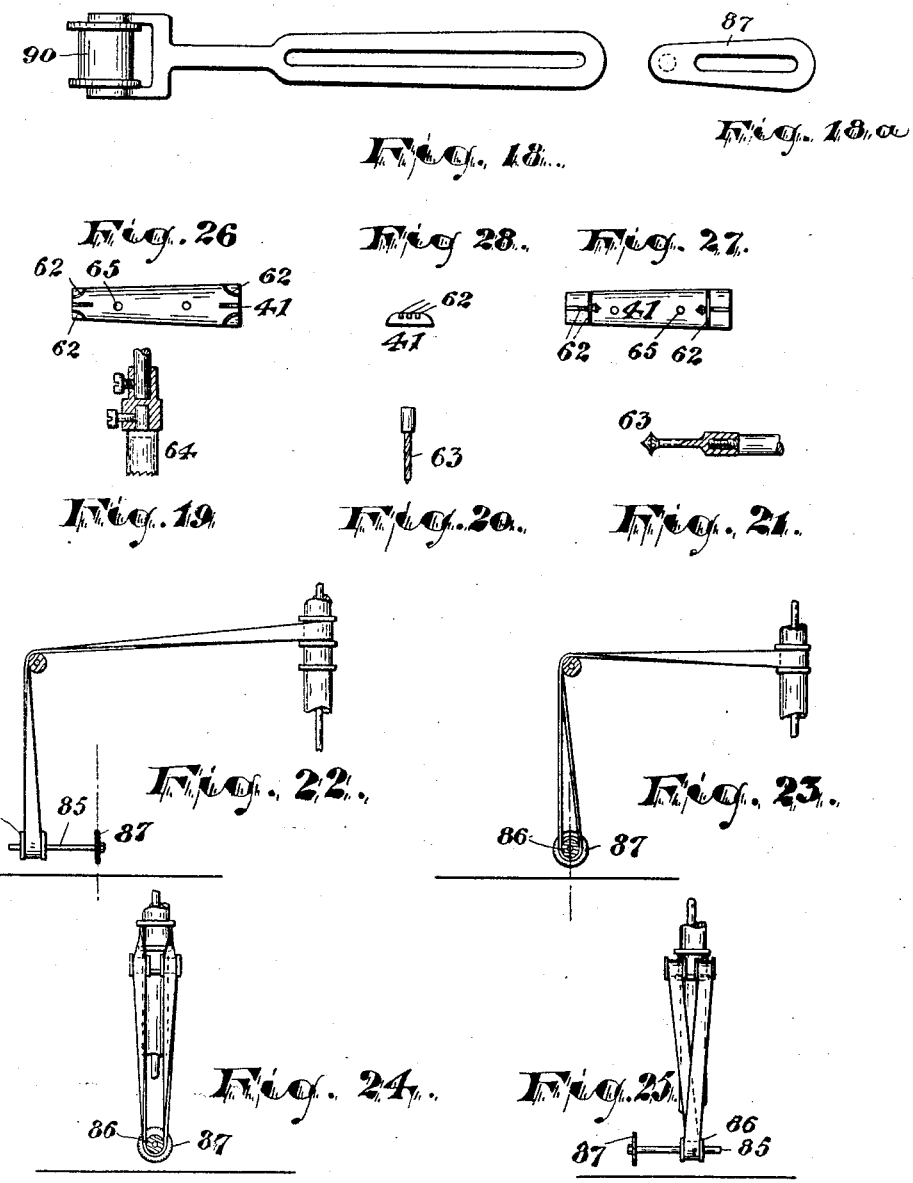

No. 779,768.

Patented January 10, 1905.

UNITED STATES PATENT OFFICE.

PATRICK F. COHEN, OF NEWARK, NEW JERSEY.

SCALE-MAKING MACHINE.

SPECIFICATION forming part of Letters Patent No. 779,768, dated January 10, 1905.

Application filed February 26, 1904. Serial No. 195,403.

*To all whom it may concern:*

Be it known that I, PATRICK F. COHEN, a citizen of the United States, residing at Newark, in the county of Essex and State of New Jersey, have invented certain new and useful Improvements in Scale-Making Machines; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

The objects of this invention are to facilitate the operation of manufacturing scales for table-cutlery handles and to reduce the cost of the same, to secure more perfect and uniform handles or scales, and to secure other advantages and results, some of which may be referred to hereinafter in connection with the description of the working parts.

The invention consists in the improved scale-making machine and in the arrangements and combinations of parts of the same, all substantially as will be hereinafter set forth and finally embraced in the clauses of the claim.

Figure 8:
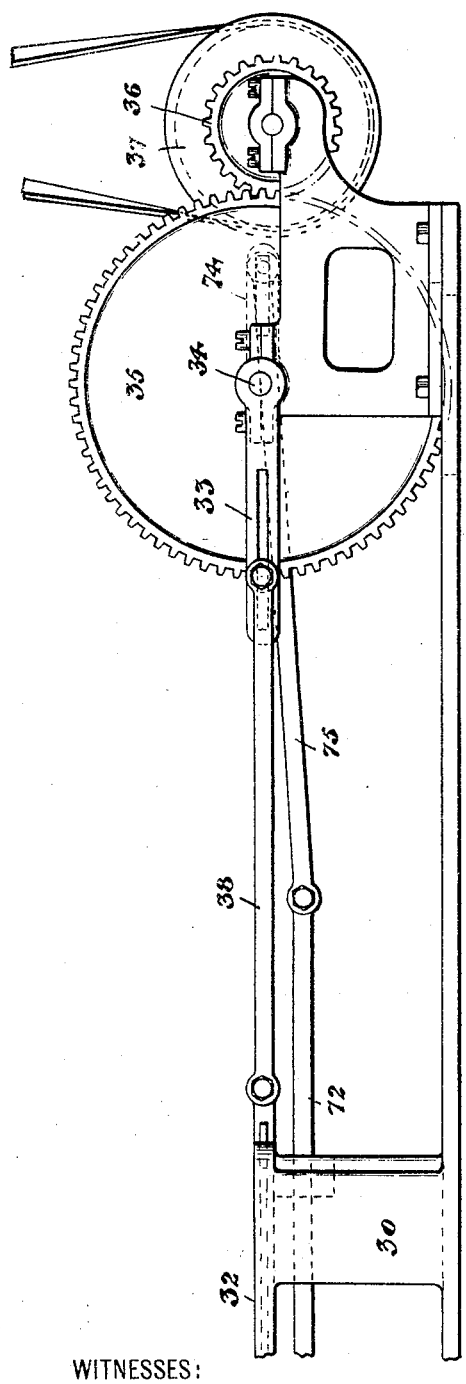
Figure 7:
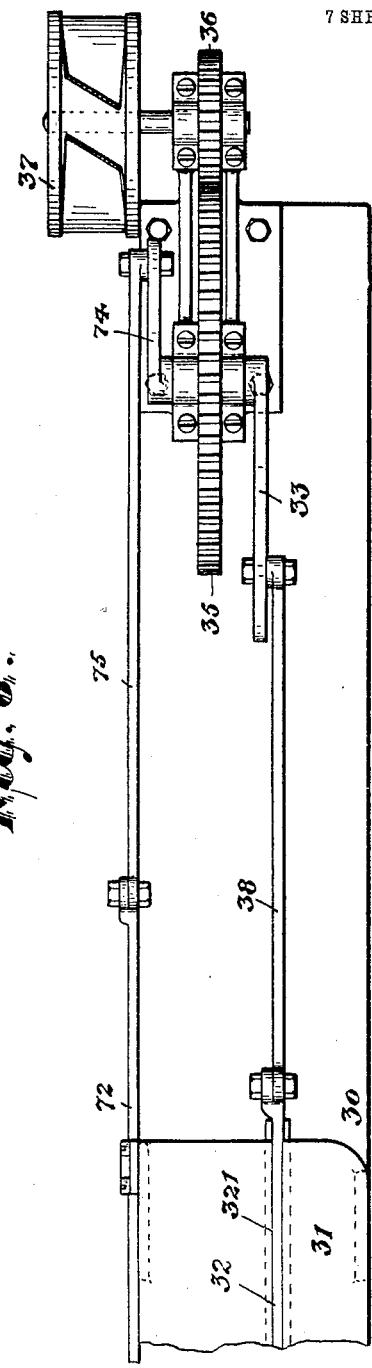

Referring to the accompanying drawings, in which like numerals of reference indicate corresponding parts in each of the several figures, Figure 1 is a plan of a portion of my machine, showing the course of the scale from the feeding device to the end of the table or bed-plate over which it travels. Fig. 2 is a detail plan of the bench or bed-plate, showing on an enlarged scale certain of a series of gages between which the scales travel. Fig. 3 is a section taken on line $x$ of Fig. 2. Fig. 4 is a plan of a slotting-head which is adjustable on said bench or bed-plate and adapted to cut slots of various kinds in the face of the scale. Fig. 5 is another plan of the same, on a reduced scale, showing the device in a different position, and thus adapted to cut a differently-located slot in the scale. Fig. 6 is a sectional view taken on line $y$ of Fig. 4. Fig. 7 is a plan, a continuation of Fig. 1, showing the means employed for forcing the scales through the guideway or passage between the gages. Fig. 8 is a side elevation of the parts shown in Fig. 7. Fig. 9 is a front elevation of a portion of the bed-plate and tool-supporting frame and connections hereinafter more fully explained. Fig. 10 is an end view of the same. Fig. 11 is a detail side view of a portion of the bed-plate and connections, showing the means for planing or giving the general outline in plan to the scale. Fig. 12 is a plan of the same, and Fig. 13 is a section taken on line $z$ of Fig. 11. Fig. 14 is a detail plan showing the gages controlling the scales immediately after they pass from the feeding-box and are about to enter the planer. Figs. 15, 16, 17, 18, $18^a$, 19, 20, 21, 22, 23, 24, 25 are detail views of certain parts, all of which will be fully explained hereinafter; and Figs. 26 and 27 are plans showing two varieties of scales, and Fig. 28 is an end view of one of the same.

In said drawings, 30 indicates a table or bench, preferably of metal, the bed-plate 31 of which at the top provides a slideway 321 for a reciprocating plunger 32, said slideway being preferably a dovetailed slot to fit the correspondingly-shaped plunger. Reciprocating movement is imparted to said plunger by means of a crank 33, Figs. 7 and 8, arranged on the rotary shaft 34 in connection with a large gear-wheel 35, taking its power from a small gear-wheel or pinion 36 and pulley 37, the latter receiving its power from any source in any suitable manner. The crank 33 is slotted longitudinally and is connected to the reciprocating plunger 32 by means of a connecting-rod 38. The plunger 32 extends a little above the level of the top of the bed-plate 31 at its extremity near to the feed-box 39 and is thus adapted to engage the end of the lowest scale of a vertical series to force the same toward the planer 40 or the first of a series of tools serving to give shape and finish to the scale, it being understood that the scales 41 lying in said box are rough-cut in flat right-angular plates, more frequently of wood. Being forced out of the box 39 by the plunger 32, the scale first enters between the guides or gages 42 42, which are transversely slotted, as in Fig. 14, and permitted a limited lateral movement, the said gages being backed by springs 43. At or about the same time that the scales pass between the gages or guides 42 they pass beneath the rotary surface-planer 40, which is adapted to smooth the broad upper surface of the scales. After the said scales pass beneath said surface-planer 40 they enter beneath a stay-strip 44 or piece adapted to press down on the top of said scales to prevent displacement while passing between the two edge-forming planers 45, which latter are adapted to give the desired rotundity to the upper edges of the scales, as in Fig. 28, and at the same time the general outline in plan, the said scales being thus made sometimes oval or tapering, as in Figs. 26 and 27, in general outline, as taste may dictate.

The top surface-planing head 40 is of any suitable construction, being arranged on a shaft 47 in suitable bearings 46 on the bed-frame 31 and being driven by a pulley 48 and belt 49 in any suitable manner. The planing-shaft 47 may be raised or lowered in its bearings to secure various sizes or thicknesses of the scales, as may be desired, the raising and lowering being accomplished by means of set-screws 50, arranged above and below the boxes in which said shaft 47 has its bearings.

The stay-piece 44, adapted to press upon the top face of the scale 41, is preferably adjustable, being carried or held by a frame or support or by two vertical rods 51 or bolts 52, carrying springs 53, which tend to press the lower edge of said piece 44 downward against the upper surface of the scales. The edge-planing tools 45 operate in connection with a former 54 underneath the table shown in Figs. 11 and 12, the said former being in connection with the plunger 32 and being driven therewith. The said former 54 is adapted to enter between two gages 55, adjustably secured upon the frame 56, on which the pulleys 57, shafts 58, and planing-tools 45 for planing the edges of the scales have their bearings, the said former 54 serving to press the gages 55 oppositely as said former is moved longitudinally therebetween, thus throwing the said edge-planing tools oppositely in accordance with the variety in the shape of the said former and effecting a corresponding shape in the scale acted on by the said edge-bearing tools. By changing the former 54 and substituting one of another shape the movements of the planing-tools are correspondingly altered to effect a desired change in the shape of the scales, as will be understood. Springs 59 serve to hold the gages against the opposite edges of the former and the frames carrying the planing-cutters in operative relation to the former, as will be evident. Suitable slots or openings are provided in the bed-plate 31 to permit the shafts 58 to extend from the pulley 57 below said bed-plate to the cutters or planing-tools above.

The scales having been given their proper outline and finish, the same are pushed forward one scale by the next behind it between a series of guides 60 and gages 61 on the bed-plate 31 underneath a series of curved slotting-tools 64 and drills 63. These may be varied to suit different kinds of straight or curved slots 62, Figs. 26, 27, 28, to be cut into the upper face of the scale 41 and rivet-holes 65 to be cut through said scale and are all adjustable, so as to effect the desired location of the slots and drill-holes in connection with the scales of various sizes and shapes. The drilling and slotting tools are preferably arranged in connection with a frame 66, Figs. 1, 9, 10, secured at the rear of the bed-plate and providing vertical bearings or slideways 67 for a supplemental frame 68, upon which a series of bearing-arms 69 are adjustably secured, the said bearing-arms 69 providing bearings at their forward ends for drill-shafts 70, having pulleys 71, and the drilling and slotting tools 63 64, the power being transmitted to said pulleys 71 by means of belts in any suitable manner.

The supplemental frame 68, arranged in slideways of the main rearward frame, is given a limited vertical movement by means of a horizontal sliding rod 72, having an inclined slot 73 therein. Said sliding rod 72 is connected with a crank 74 on the driving-shaft 34 by means of a connecting-rod 75, Figs. 7 and 8, the rotation of the driving-wheel 35, its crank 74, and shaft 34 serving to give reciprocating movement to the horizontally-sliding rod 72 having the inclined slot.

At the bottom of the supplemental frame 66 is an arm 76, having a pin 77 arranged in said inclined slot 73, the parts being so disposed as to produce a vertical sliding movement of the sliding frame 68 when the horizontally-sliding rod is operated.

The parts thus far described are so timed in their relation to one another and with the plunger 32 as to effect when the plunger is in the act of driving the scales forward between the gages and guides 60 61 an elevation of the vertically-sliding supplemental frame 68, and when the scales have been brought to their proper positions to be operated on the said frame 68 will descend and bring the drills and slotting-tools into engagement with the scales to form the desired holes and slots. Furthermore, the parts are so disposed as to bore the several drill-holes and slots in one downward movement of the frame, in some cases two or more drill-holes being formed in one scale and simultaneously slots and other drill-holes formed in the other scale in the series of scales.

Figure 15:
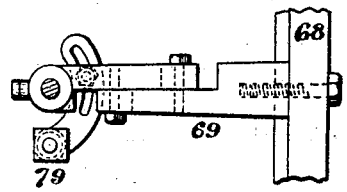
Figure 16:
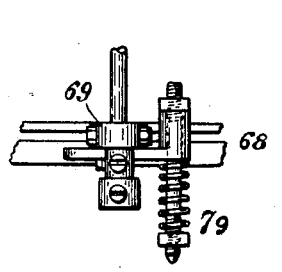
Figure 17:
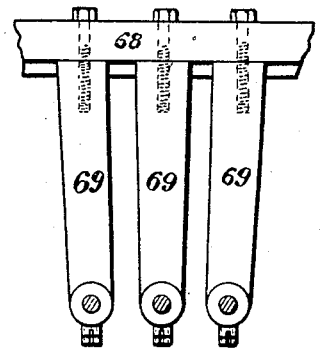

I prefer to provide a series of automatic spring-actuated pressure-feet, such as illustrated in Figs. 15 and 16, adapted to move with the vertical movable supplemental frame to engage or press on the scales in their downward movements, so as to hold the said scales rigidly in place between the guides and gages during the cutting operation. I prefer to have one or two of such pressure-feet in connection with each scale being acted upon.

On the bed-plate 31 is adjustably and separably arranged in a slot 82, extending lengthwise of the bed-plate, at the front thereof, a saw 80 for making straight slots in the upper surface of the scales. Said slotting-saw 80 comprises an adjustable head 81, adapted to be clamped in the groove 82 upon the plate 31 and having ears 83, between which is a pivotal shaft-carrying arm 84, the said shaft-carrying arm 84 having bearings in which is pivoted the shaft 85 and between which is a pulley 86, adapted to receive a belt for rotating the said shaft. The said shaft 85 extends laterally beyond the said arm and carries a rotary slotting-saw blade 87 of any suitable type or variety adapted to cut a straight slot in the upper face of the scale extending in any direction in accordance with its adjustment. The said arm 84 is adapted to be depressed against the resistance of a spring 851, Fig. 6, by an arm 861, adjustably secured to the supplemental frame and vertically movable therewith, the said adjustable arm 861 being connected to the saw-operating frame by means of a connecting rod or arm 871, the parts being so adjusted and arranged as to effect a downward movement of the saw-carrying arm 84 when the supplemental frame is thrown downward, the down movement of the supplemental frame being transmitted to the saw-carrying arm and to the saw-blade, so as to bring the said saw-blade in contact with the scale at the lower limit of movement, so as to cut the slot. The arms 84 and 871 are in adjustable sections to permit the operator to properly locate the slots. I prefer to use from one to four of these saws 80 at one time, the said saws producing slots of various kinds and the slots when finally formed serving to receive the cast metal by which certain ornamental effects are produced in connection with the knife-handle well known in the art. The said saws may be driven by belts arranged in connection with pulleys and idle pulleys 90 in any suitable manner.

The plunger 32 first described has a movement about equal to the length of one of the scales, and so with each descent of the supplemental frame and its connections each tool is brought into operative contact with a new scale and several scales are constantly in a series beneath the series or collection of tools.

It will be understood that the scales 41 are placed automatically end to end in a series and at each movement of the plunger 32 the series of scales on the bed-plate as a whole will move forward a distance equal to the length of the scale last fed into the series, and at each descent of the supplemental frame and its connections each scale is brought into contact with a new tool, so that virtually six or eight scales are being wrought upon at one time in ordinary practice, these operations of course being varied at will to suit various designs of handles. After leaving the series of tools the said scales 41 are forced out of the machine and drop into a suitable receptacle therefor and are then ready for insertion in the knife.

In connection with my device it may be understood that the cuts or slots in the handle may be such as are commonly known as half-rings, quarter-rings, whole rings, longitudinal slots, transverse slots, or slots at any desired angle, in accordance with the style of knife desired.

In operating the device power is transmitted to the several operating parts, so that the series of scales are first shaped and planed, then subjected to the slotting and drilling tools; but even these operations may be reversed in order without departing from the invention.

Having thus described the invention, what I claim as new is—

1. The improved knife-handle-scale-forming device, comprising a feed, a bed-plate having thereon a slideway for a reciprocating plunger, a plunger in said slideway adapted to move the scales from said feed, means for operating said plunger, a surface-planer near said feed adapted to receive the scale therefrom, said planer being adapted to plane the top surface of said scale, means for operating said planer, a stay-strip located near said planer and adapted to press down upon the scale after the upper surface thereof is planed, edge-forming planers arranged near said stay-strip and adapted to give shape to the edges of said scales, and means for operating said edge-planers, and slotting-tools and drills disposed in order to engage the scales after the edges thereof have been planed, and means for operating said slotting-tools and drills, said tools and drills operating simultaneously to slot one scale while another is being drilled, substantially as set forth.

2. The improved knife-scale-forming device, herein described, comprising a bed-plate, a plunger and means for reciprocating the same, a slideway for the scales, a planer for planing the top of the scale, means for operating the planer, planers for planing the opposite edges of the scale arranged in serial order with relation to the first said planer, means for operating the edge-planers, a vertical frame arranged in serial order after said planers and in connection with the bed-plate, a supplemental frame sliding vertically on said vertical frame, and having in connection therewith drills, and slotting-tools or cutters, means for vertically operating the said vertically-sliding frame, the movements of the said sliding frame being timed to effect a drilling and slotting action, while the scales are at rest on the bed-plate, substantially as set forth.

3. In a scale-finishing machine, the combination with a scale-feed, of a face-planer, opposite side or edge planers, and a former governing the movements of the last said planers and drilling and slotting tools arranged in serial order with said planers, and means for operating said parts, substantially as and for the purposes set forth.

4. In a scale-finishing machine, the combination with means for forcing the scales forward in serial order, of a supplemental frame, a vertically-sliding frame carrying a plurality of cutting-tools adapted to cut into the surface of said scales and having an arm with a pin or projection, a sliding rod having an inclined slot and means for reciprocating said rod. substantially as set forth.

5. In a scale-finishing machine, the combination with a bed-plate, of a frame movable perpendicular to said bed-plate and carrying a plurality of tools adapted to work simultaneously upon different scales of a series lying in said bed-plate, a feed adapted to guide the scales onto said bed-plate, a plunger adapted to engage the scale last fed to said bed-plate and force it and those lying in line therewith forward on the bed-plate, means for raising and lowering the frame, a gear-wheel, cranks operating therewith and connected to said plunger and to said means for raising and lowering the frame, and means for rotating said gear-wheel.

6. In a scale-finishing machine, the combination with a bed-plate having a series of springs between which the scales travel, planers for smoothing the upper surface of the scale, edge-planers for shaping the scale in plan, and slotting and boring tools disposed to bore the scales after the same have been planed by said planers, a vertically-movable frame providing boxes or bearings for said boring-tools, said frame having an arm and pin, means for rotating said boring-tools, a rod with an inclined slot in which said pin is arranged, means for moving said rod longitudinally and effecting a movement of the frame in a direction perpendicular to the bed-plate, and means for forcing the scales forward between said springs.

In testimony that I claim the foregoing I have hereunto set my hand this 18th day of February, 1904.

PATRICK F. COHEN.

Witnesses:
CHARLES H. PELL,
LUKE GIBNEY.